United States Patent
Arquero et al.

(10) Patent No.: US 10,007,661 B2
(45) Date of Patent: Jun. 26, 2018

(54) AUTOMATED RECEIVER MESSAGE SENTIMENT ANALYSIS, CLASSIFICATION AND PRIORITIZATION

(71) Applicant: International Business Machines Corporation, Armonk, NY (US)

(72) Inventors: Gregg M. Arquero, Poughkeepsie, NY (US); Eli M. Dow, Wappingers Falls, NY (US); Syed F. Hossain, Hopewell Junction, NY (US); Joshua Schaeffer, White Plains, NY (US); Yunli Tang, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days. days.

(21) Appl. No.: 15/275,658

(22) Filed: Sep. 26, 2016

(65) Prior Publication Data

US 2018/0089168 A1    Mar. 29, 2018

(51) Int. Cl.

| | |
|---|---|
| *G06F 17/27* | (2006.01) |
| *G06F 17/28* | (2006.01) |
| *G06F 17/21* | (2006.01) |
| *H04L 12/58* | (2006.01) |
| *G06F 17/22* | (2006.01) |

(52) U.S. Cl.
CPC ........ *G06F 17/279* (2013.01); *G06F 17/2264* (2013.01); *H04L 51/04* (2013.01); *H04L 51/046* (2013.01); *H04L 51/24* (2013.01); *H04L 51/26* (2013.01)

(58) Field of Classification Search
CPC ........................... G06F 17/2785; G06F 17/279
See application file for complete search history.

(56) References Cited

U.S. PATENT DOCUMENTS

| | | |
|---|---|---|
| 6,424,997 B1 | 7/2002 | Buskirk et al. |
| 6,816,885 B1 | 11/2004 | Raghunandan |
| 7,174,366 B2 | 2/2007 | Chou |

(Continued)

OTHER PUBLICATIONS

Email Sentiment Analysis. (n.d.). Retrieved Sep. 14, 2016, from https://support.getbase.com/hc/en-us/articles/205056535-Email-Sentiment-Analysis.

(Continued)

*Primary Examiner* — Matthew Baker
(74) *Attorney, Agent, or Firm* — Cantor Colburn LLP; Steven Chiu

(57) ABSTRACT

Techniques are provided for performing automated operations to analyze and prioritize incoming user messages. An indication of a message sent to a recipient user is received. Based at least in part on configuration information associated with the recipient user, the received message is analyzed. Analyzing the received message includes at least one of determining sentiments associated with the received message, determining intentions associated with the received message, determining document classes associated with the received message, and generating summary information corresponding to the received message. Based at least in part on the analyzing of the received message, a prioritized listing of multiple messages associated with the recipient user, including the received message, is displayed to the recipient user.

20 Claims, 4 Drawing Sheets

(56) References Cited

U.S. PATENT DOCUMENTS

| | | | |
|---|---|---|---|
| 7,185,065 B1* | 2/2007 | Holtzman | G06F 17/2745 705/36 R |
| 7,299,261 B1 | 11/2007 | Oliver et al. | |
| 8,095,613 B1* | 1/2012 | Perkowitz | G06Q 10/109 709/206 |
| 9,331,965 B2* | 5/2016 | Caskey | H04L 51/02 |
| 9,336,268 B1* | 5/2016 | Moudy | G06F 17/30412 |
| 9,442,916 B2* | 9/2016 | O'Sullivan | G06F 17/241 |
| 2006/0010217 A1* | 1/2006 | Sood | H04L 51/12 709/206 |
| 2011/0320541 A1 | 12/2011 | Bendel et al. | |
| 2012/0005284 A1* | 1/2012 | Tse | G06Q 10/10 709/206 |
| 2013/0103667 A1 | 4/2013 | Minh | |
| 2013/0346067 A1 | 12/2013 | Bhatt | |
| 2015/0039703 A1 | 2/2015 | Kursun | |
| 2015/0200899 A1* | 7/2015 | Sanketi | H04L 51/24 709/206 |
| 2015/0278195 A1* | 10/2015 | Yang | G06F 17/2785 704/9 |
| 2015/0286627 A1* | 10/2015 | Chang | G06F 17/2705 704/9 |
| 2016/0125751 A1* | 5/2016 | Barker | G06F 17/3053 434/322 |

OTHER PUBLICATIONS

Arquero, Gregg M. et al., "Automated Message Sentiment Analysis and Aggregation" U.S. Appl. No. 15/275,660, filed Sep. 26, 2016.
Arquero, Gregg M. et al., "Automatic Summarization of Emails and Generation of Subject Lines," U.S. Appl. No. 15/379,867, filed Dec. 15, 2016.
List of IBM Patents or Patent Applications Treated as Related; Date Filed: Sep. 26, 2016, pp. 1-2.

* cited by examiner

AUTOMATED RECEIVER MESSAGE SENTIMENT ANALYSIS, CLASSIFICATION AND PRIORITIZATION

BACKGROUND

This disclosure relates to a method and a system to perform automated operations for incorporating automated sentiment analysis, document classification, text summarization, and prioritization of incoming messages intended for recipient users.

Reading through all the messages we receive on a daily or weekly basis is time-consuming. Such messages typically include extraneous information the recipient user does not care about, but which the recipient user must at least skim in order to locate and identify any information in the message that is relevant and/or important. Such messages may also contain useful sentiment information that may not be properly utilized by the recipient user or their organization.

SUMMARY

According to at least one embodiment, a method for analyzing and prioritizing incoming user messages. The method is implemented by one or more computing systems and comprises receiving an indication of a message sent to a recipient user, and analyzing, based at least in part on configuration information associated with the recipient user, the received message. Analyzing the received message includes at least one of determining one or more sentiments associated with the received message, determining one or more intentions associated with the received message, determining one or more document classes associated with the received message, and generating summary information corresponding to the received message. The method further comprises displaying, based at least in part on the analyzing of the received message, a prioritized listing to the recipient user of multiple messages associated with the recipient user. The prioritized listing of multiple messages includes the received message.

According to another embodiment, a non-transitory computer-readable storage medium has stored contents that, when executed, configures a computing system to perform a method for analyzing and prioritizing incoming user messages that comprises receiving an indication of a message sent to a recipient user, and analyzing, based at least in part on configuration information associated with the recipient user, the received message. Analyzing the received message includes at least one of determining one or more sentiments associated with the received message, determining one or more intentions associated with the received message, determining one or more document classes associated with the received message, and generating summary information corresponding to the received message. The method further comprises displaying, based at least in part on the analyzing of the received message, a prioritized listing to the recipient user of multiple messages associated with the recipient user. The prioritized listing of multiple messages includes the received message.

According to another embodiment, a computing system comprises one or more processors and at least one memory that includes instructions that, upon execution by a processor, cause the computing system to perform a method for analyzing and prioritizing incoming user messages. The method comprises receiving an indication of a message sent to a recipient user, and analyzing, based at least in part on configuration information associated with the recipient user, the received message. Analyzing the received message includes at least one of determining one or more sentiments associated with the received message, determining one or more intentions associated with the received message, determining one or more document classes associated with the received message, and generating summary information corresponding to the received message. The method further comprises displaying, based at least in part on the analyzing of the received message, a prioritized listing to the recipient user of multiple messages associated with the recipient user. The prioritized listing of multiple messages includes the received message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

One or more embodiments described herein enable one or more processor-based computing systems to reduce user time required to review incoming messages by providing techniques incorporating automated sentiment analysis, document classification, text summarization, and prioritization with respect to such messages. Additionally, sentiment data performed on such user messages may provide both recipient users and their organizations with beneficial information, such as a variety of organizational message analytics. Such analytics may, for example, be beneficial for determining employee satisfaction, stress levels, overall satisfaction of message recipients or senders, etc. In one or more embodiments, some or all of the techniques described herein may be performed by a Message Sentiment, Classification, and Prioritization (MSCP) system.

Aspects of particular techniques described herein may also be described within U.S. patent application Ser. No. 15/275,660, entitled "AUTOMATED MESSAGE SENTIMENT ANALYSIS AND AGGREGATION," which is hereby incorporated herein in its entirety.

As used herein, the term "message" refers to any text-based communication intended for a user, and may in at least some embodiments include multimedia messages, e-mail messages, and textual messages that include additional non-text items.

In certain embodiments, the MSCP system may operate in conjunction with an email application associated with a user that is the recipient of one or more messages received for analysis by the MSCP system, such as via a software application plugin executed in conjunction with the email application.

Figure 1:
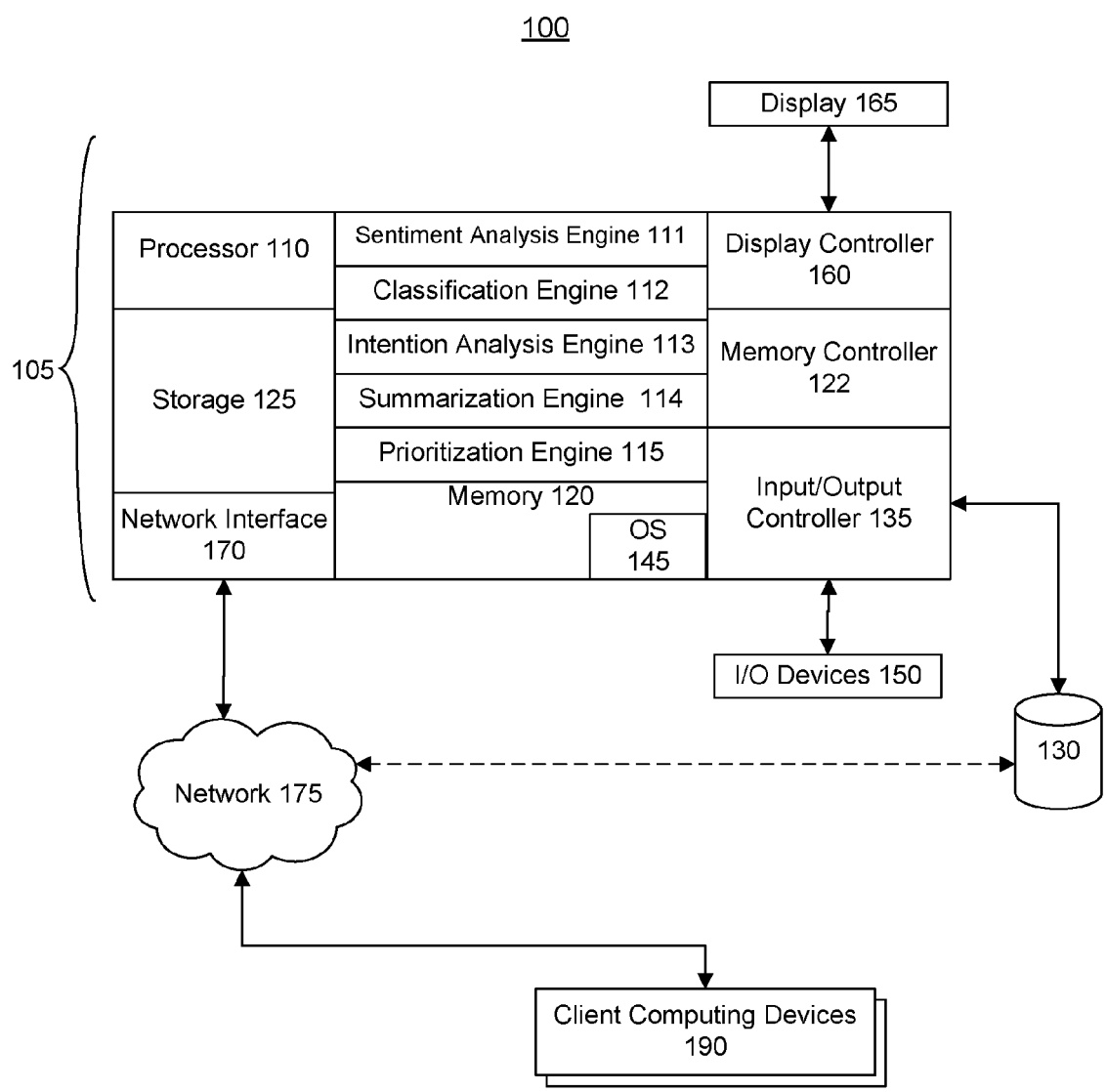
FIG. 1 depicts a block diagram of an exemplary network environment and computing system in accordance with an embodiment.

FIG. 1 illustrates a block diagram of a networked computing system 100 for use as an MSCP system in performing various techniques described herein. Such techniques may be performed or otherwise implemented via hardware, software (e.g., firmware), or combination thereof. In an exemplary embodiment, the methods described herein are implemented in hardware as the depicted MSCP system, which may include the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a processor 110, a sentiment analysis engine 111, a classification engine 112, an intention analysis engine 113, a prioritization engine 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who interact with the MSCP system in order to have the MSCP system perform various operations regarding messages directed to those users, or to receive information from the MSCP system regarding individual messages or collections thereof.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
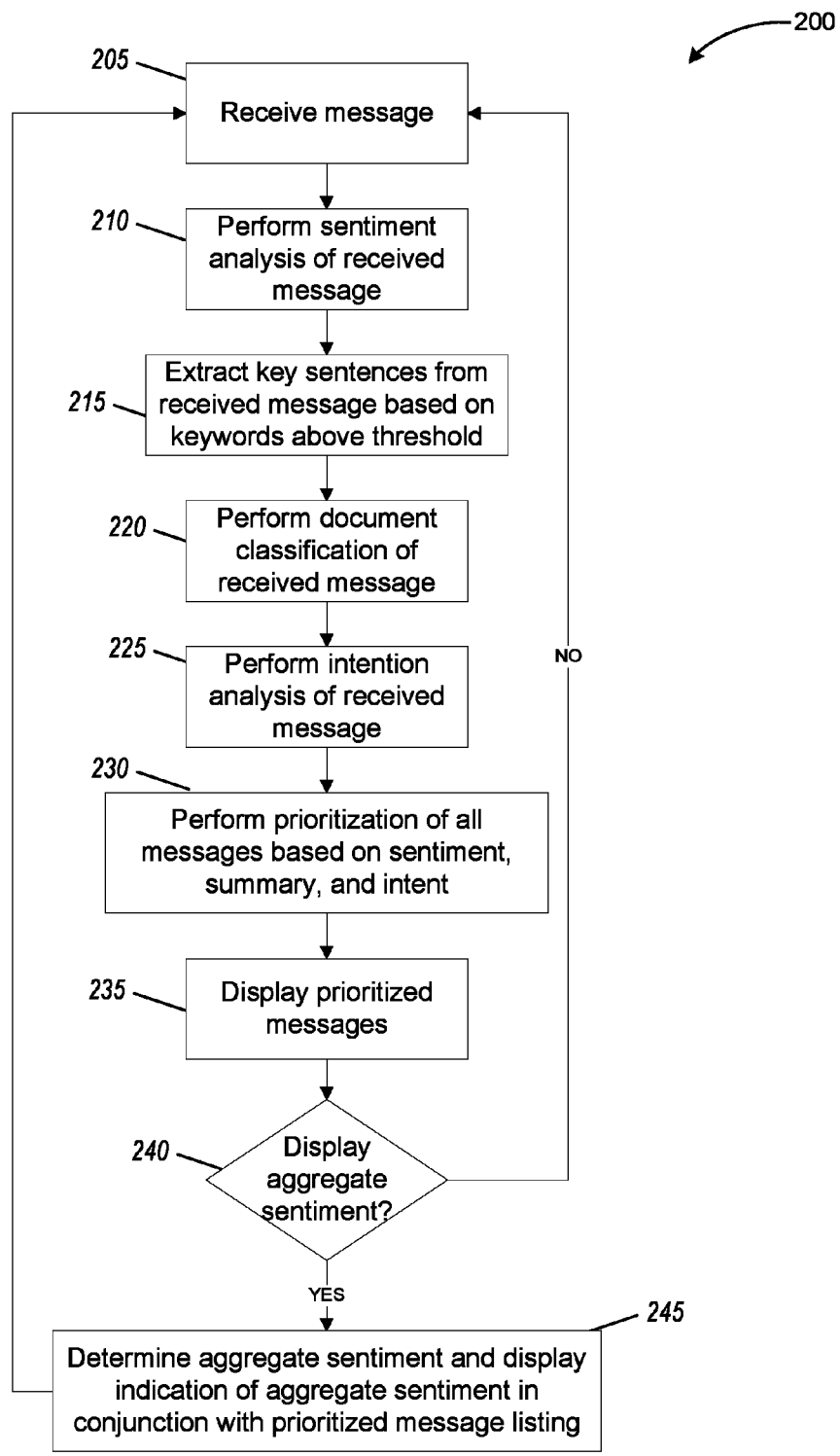
FIG. 2 depicts a process flow for a Message Sentiment, Classification, and Prioritization (MSCP) system in accordance with an embodiment of techniques described herein.

FIG. 2 depicts a process flow routine 200 for an MSCP System in accordance with an embodiment of techniques described herein. The routine begins at block 205, in which the MSCP system receives a message intended for a user recipient of the MSCP system. At block 210, the MSCP system begins analyzing the received message by performing sentiment analysis of the received message, such as in accordance with preference information or other configuration settings associated with and/or provided by the user recipient.

At block 215, the MSCP system continues analyzing the received message by extracting one or more key sentences from the received message, such as if the sentences to be extracted contain particular keywords identified by the MSCP system as exceeding a threshold relevance level. In one or more embodiments, the extracting of key sentences from the received message may be part of summarizing the received message, such as to display a summary of the received message for the recipient user prior to displaying the full contents of the received message.

At block 220, the MSCP system performs document classification of the received message, such as in accordance with preference information or other configuration settings associated with and/or provided by the user recipient. In at least some embodiments, the document classification may include determining one or more predefined categories that may be associated with the received message based upon its contents. Furthermore, in at least one embodiment, the document classification in block 220 may be based at least in part on the key sentences extracted by the MSCP system in block 215.

At block 225, the MSCP system performs intention analysis of the received message in order to determine one or more intentions associated with the received message. In one or more embodiments, the intention analysis is performed in accordance with one or more preferences or other configuration settings associated with and/or provided by the user recipient. Examples of intentions may include, as non-limiting examples: anger, sadness, frustration, happiness, satisfaction, etc. In various embodiments and circumstances, one or more of these and other exemplary intentions may be determined by the MSCP system to be appropriately associated with the received message.

At block 230, the MSCP system performs prioritization analysis of multiple (whether all or a subset of) messages associated with the user recipient based on results of the sentiment analysis of block 210, of the key sentence extraction of block 215, of the document classification of block 220, and of the intention analysis of block 225. In one or more embodiments, prioritization analysis of the multiple messages may further be based on one or more additional analyses, or on aspects of the analyses described above not explicitly shown in FIG. 2. For example, prioritization analysis may be based at least in part on one or more action items and/or action times determined as a result of the intention analysis of block 225 but not shown.

At block 235, the MSCP system displays a listing of multiple messages associated with the recipient user, in a manner prioritized based on the prioritization analysis of block 230. As one example, such higher priority display may be associated with a higher physical location on a display device, a greater textual size, or other prioritized manner. In one or more embodiments, the prioritized listing may be displayed in accordance with preference information or other configuration settings associated with and/or provided by the recipient user. As one example, the message listing may be prioritized such that messages associated with one or more predefined sentiments (e.g., anger or frustration) are displayed with a higher priority than those messages associated with other predefined sentiments.

At block 240, the MSCP system determines whether it is to determine and display an aggregate sentiment associated with multiple of the messages associated with the recipient user, such as based on one or more criteria defined by preference information or other configuration settings associated with and/or provided by the recipient user. For example, the MSCP system may be configured to assess and provide an indication of an aggregated sentiment regarding a subset of the messages associated with the recipient user, such as messages received in a particular time period, messages received from one or more specified users or organizations, messages received from an organization associated with the recipient user as opposed to messages received from external sources, etc.

If it is determined in block 240 to determine and display aggregate sentiment associated with all or a subset of messages associated with the recipient user, the routine proceeds to block 245 to determine such aggregate sentiment and display an indication of that aggregate sentiment in conjunction with the prioritized message listing. Otherwise, or once the display of the aggregate sentiment is completed, the routine returns to block 205 to await the receipt of an additional message intended for the recipient user.

Figure 3:
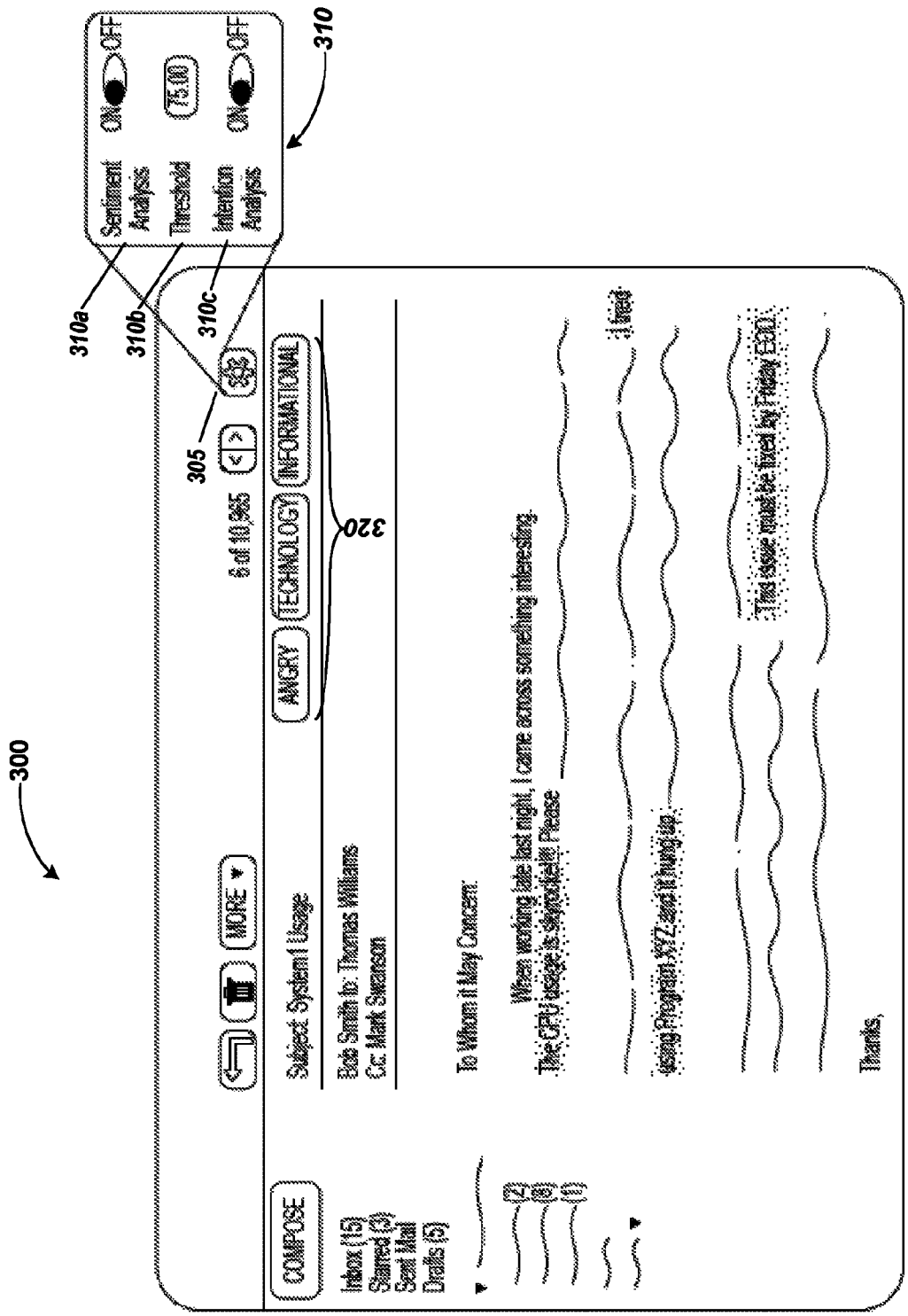
FIGS. 3 and 4 depict portions of a graphical user interface provided by an MSCP system in accordance with an embodiment of techniques described herein.

FIG. 3 depicts a portion of a graphical user interface (GUI) 300 provided by an MSCP system in accordance with an embodiment of techniques described herein. In particular, GUI 300 depicts the display of a message intended for a user recipient, in which the MSCP system has incorporated multiple elements regarding the analysis of the displayed message.

In the depicted embodiment, the GUI 300 includes a settings control 305 that, when activated, initiates the display of settings panel 310. The settings panel 310 includes sentiment analysis control 310*a*, which in the depicted embodiment operates as a toggle switch selectively enabling or disabling sentiment analysis to be performed on incoming messages by the MSCP system; threshold selector control 310*b*, which in the depicted embodiment allows the user to enter a threshold value for determining, for example, a degree to which summarization and/or sentence extraction is performed on incoming messages by the MSCP system; and intention analysis control 310*c*, which in the depicted embodiment operates as a toggle switch enabling or disabling intention analysis to be performed on incoming messages by the MSCP system (similar to sentiment analysis control 310*a*).

The GUI 300 of FIG. 3 further includes sentiment indicators 320, which provide an indication to the user of those sentiments determined to be associated with the displayed message. In particular, in the illustrated example, sentiment indicators 320 indicate that the received message is associated with the sentiments "angry," "technology," and "informational." Thus, in the depicted example and in one or more additional embodiments, the MSCP system may determine sentiments (such as "technology" and "informational") other than those evidencing human emotions.

Figure 4:
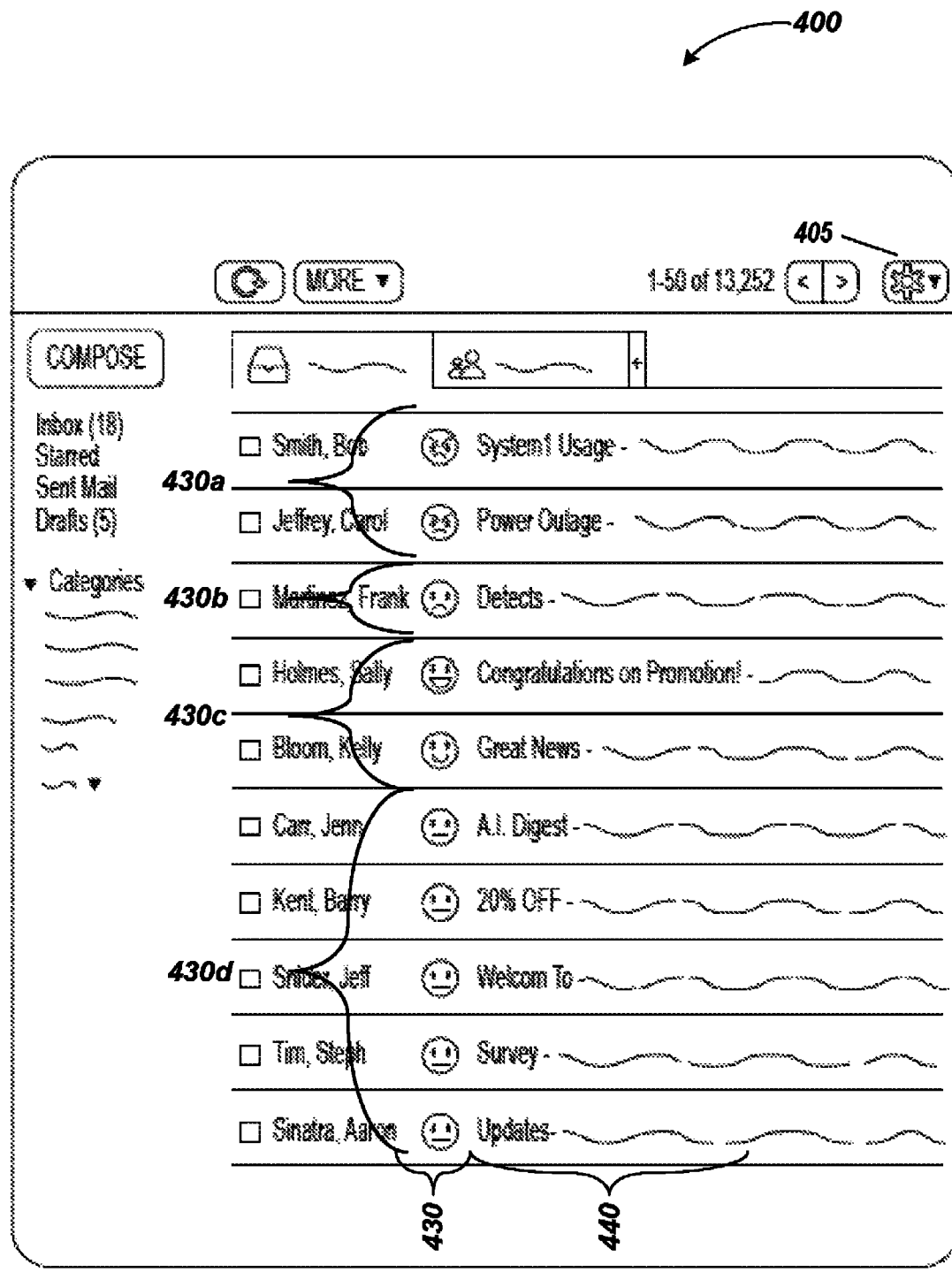

FIG. 4 depicts a portion of a graphical user interface (GUI) 400 provided by an MSCP system in accordance with an embodiment of techniques described herein. In particular, GUI 400 depicts the display of a prioritized list of multiple messages that have been analyzed by the MSCP system, such as in accordance with user preference information or other configuration information. Such preferences and/or configuration may at least in part be selected by the user, such as by use of settings control 405 in a manner similar to that described with respect to settings control 305 in FIG. 3.

In the depicted embodiment, the GUI 400 includes sentiment indicators 430, which in the current example provide graphical indicators associated with particular sentiments. In the illustrated example, the MSCP system has prioritized the display of email messages associated with negative sentiments. In particular, the topmost messages are associated with angry sentiments 430*a*, with subsequent messages being successively associated with unhappy sentiments 430*b*, positive sentiments 430*c*, and neutral sentiments 430*d*. Also in the depicted embodiment, GUI 400 further includes intention indicators 440, which the MSCP system has provided as the results of intention analysis for each of the multiple messages listed.

In one or more embodiments, various implementations of the types of analysis described above may be performed in conjunction with one or more previously published or open source programming libraries (such as one or more APIs) that may perform and/or utilize natural-language processing. For example, in certain embodiments, the MSCP system may utilize one or more of the Alchemy API, the MALLET library, or other programming library.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that are stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for analyzing and prioritizing incoming user messages comprising:
    receiving, by one or more computing systems, an indication of a message sent to a recipient user;
    analyzing, by the one or more computing systems and based at least in part on one or more natural-language processing libraries and on configuration information associated with the recipient user, a received message, wherein analyzing the received message includes:
        determining, by a classification engine of the one or more computing systems, one or more document classes associated with the received message, wherein the determining one or more document classes is based at least on key sentences extracted from text within a body of the received message;
        performing intention analysis of the received message in order to determine one or more intentions associated with the received message, wherein the intentions correspond to different types of sentiment comprising an angry sentiment, an unhappy sentiment, and a neutral sentiment; and
        generating, by the one or more computing systems, summary information corresponding to the received message, wherein the generating summary information is based at least on the key sentences extracted from text within the body of the received message; and
    displaying, by the one or more computing systems and based at least in part on the analyzing of the received message, a prioritized listing to the recipient user of multiple messages associated with the recipient user, wherein the prioritized listing of multiple messages includes the received message, the prioritized listing of multiple messages are prioritized by sentiment type, the topmost messages of the prioritized listing of multiple message are associated with the angry sentiment, messages associated with the unhappy sentiment are listed subsequent to the messages associated with the angry sentiment, and messages associated with the neutral sentiment are listed subsequent to the messages associated with the unhappy sentiment.

2. The computer-implemented method of claim 1 wherein analyzing the received message includes generating summary information corresponding to the received message, and wherein generating summary information corresponding to the received message includes extracting one or more key sentences from the received message.

3. The computer-implemented method of claim 1 wherein analyzing the received message includes determining one or more sentiments associated with the received message, and wherein the method further comprises determining one or more additional sentiments associated with each of at least some of the multiple messages.

4. The computer-implemented method of claim 3 wherein displaying the prioritized listing of the multiple messages associated with the recipient user includes displaying an indication of at least one of the one or more sentiments associated with each of the at least some of the multiple messages.

5. The computer-implemented method of claim 3 wherein the method further comprises determining an aggregate sentiment associated with the at least some of the multiple messages, and wherein displaying the prioritized listing of the multiple messages associated with the recipient user includes displaying an indication of the aggregate sentiment.

6. The computer-implemented method of claim 5, further comprising providing an indication of the aggregate sentiment to one or more users other than the recipient user associated with the multiple messages.

7. The computer-implemented method of claim 1 wherein analyzing the received message includes determining one or more document classes associated with the received message, wherein the method further comprises determining one or more additional document classes associated with each of at least some of the multiple messages, and wherein displaying the prioritized listing of the multiple messages associated with the recipient user includes displaying an indication of at least one of the one or more document classes associated with each of the at least some of the multiple messages.

8. The computer-implemented method of claim 1 wherein the received message is an e-mail message, and wherein the configuration information associated with the recipient user is provided via a software application plugin executed in conjunction with an email client of the recipient user.

9. The computer-implemented method of claim 1 wherein analyzing the received message includes determining one or more intentions associated with the received message, and wherein determining the one or more intentions includes determining an action time associated with at least one or the one or more intentions.

10. The computer-implemented method of claim 9 wherein displaying the prioritized listing of the multiple messages is further based on the determined action time associated with the at least one intention.

11. The computer-implemented method of claim 1, further comprising:
    analyzing at least some of the multiple messages in a manner substantially similar to the analyzing of the received message, and prior to displaying the prioritized listing of the multiple messages, prioritizing the multiple messages based on the analyzing of the at least some of the multiple messages.

12. A non-transitory computer-readable medium having stored contents that, when executed, configure a computing system to perform a method for analyzing and prioritizing incoming user messages, the method comprising:
receiving, by the configured computing system, an indication of a message sent to a recipient user;
analyzing, by the configured computing system and based at least in part on one or more natural-language processing libraries and on configuration information associated with the recipient user, a received message, wherein analyzing the received message includes:
determining, by a classification engine of the configured computing system, one or more document classes associated with the received message, wherein the determining one or more document classes is based at least on key sentences extracted from text within a body of the received message;
performing intention analysis of the received message in order to determine one or more intentions associated with the received message, wherein the intentions correspond to different types of sentiment comprising an angry sentiment, and unhappy sentiment, and a neutral sentiment; and
generating, by the configured computing system, summary information corresponding to the received message, wherein the generating summary information is based at least on the key sentences extracted from text within the body of the received message; and
displaying, by the configured computing system and based at least in part on the analyzing of the received message, a prioritized listing to the recipient user of multiple messages associated with the recipient user, wherein the prioritized listing of multiple messages includes the received message, the prioritized listing of multiple messages are prioritized by sentiment type, the topmost messages of the prioritized listing of multiple messages are associated with the angry sentiment, messages associated with the unhappy sentiment are listed subsequent to the messages associated with the angry sentiment, and messages associated with the neutral sentiment are listed subsequent to the messages associated with the unhappy sentiment.

13. The non-transitory computer-readable medium of claim 12 wherein analyzing the received message includes generating summary information corresponding to the received message, and wherein generating summary information corresponding to the received message includes extracting one or more key sentences from the received message.

14. The non-transitory computer-readable medium of claim 12 wherein analyzing the received message includes determining one or more sentiments associated with the received message, and wherein the method further comprises determining one or more additional sentiments associated with each of at least some of the multiple messages.

15. The non-transitory computer-readable medium of claim 14 wherein displaying the prioritized listing of the multiple messages associated with the recipient user includes displaying an indication of at least one of the one or more sentiments associated with each of the at least some of the multiple messages.

16. The non-transitory computer-readable medium of claim 14 wherein the method further comprises determining an aggregate sentiment associated with the at least some of the multiple messages, and wherein displaying the prioritized listing of the multiple messages associated with the recipient user includes displaying an indication of the aggregate sentiment.

17. The non-transitory computer-readable medium of claim 16, further comprising providing an indication of the aggregate sentiment to one or more users other than the recipient user associated with the multiple messages.

18. The non-transitory computer-readable medium of claim 12 wherein analyzing the received message includes determining one or more document classes associated with the received message, wherein the method further comprises determining one or more additional document classes associated with each of at least some of the multiple messages, and wherein displaying the prioritized listing of the multiple messages associated with the recipient user includes displaying an indication of at least one of the one or more document classes associated with each of the at least some of the multiple messages.

19. The non-transitory computer-readable medium of claim 12 wherein the received message is an e-mail message, and wherein the configuration information associated with the recipient user is provided via a software application plugin executed in conjunction with an email client of the recipient user.

20. A system, comprising:
one or more processors; and
at least one memory, the memory including instructions that, upon execution by at least one of the one or more processors, cause the system to perform a method for analyzing and prioritizing incoming user messages, the method comprising:
receiving an indication of a message sent to a recipient user;
analyzing a received message based at least in part on one or more natural-language processing libraries and on configuration information associated with the recipient user, wherein analyzing the received message includes:
determining one or more document classes associated with the received message, wherein the determining one or more document classes is based at least on key sentences extracted from text within a body of the received message;
performing intention analysis of the received message in order to determine one or more intentions associated with the received message, wherein the intentions correspond to different types of sentiment comprising an angry sentiment, an unhappy sentiment, and a neutral sentiment; and
generating summary information corresponding to the received message, wherein the generating summary information is based at least on the key sentences extracted from text within the body of the received message; and
displaying, based at least in part on the analyzing of the received message, a prioritized listing to the recipient user of multiple messages associated with the recipient user, wherein the prioritized listing of multiple messages includes the received message, the prioritized listing of multiple messages are prioritized by sentiment type, the topmost messages of the prioritized listing of multiple messages are associated with the angry sentiment, messages associated with the unhappy sentiment are listed subsequent to the messages associated with the angry sentiment, and messages associated with the neutral sentiment are listed subsequent to the messages associated with the unhappy sentiment.

* * * * *